US009432755B2

United States Patent
Luo et al.

(10) Patent No.: US 9,432,755 B2
(45) Date of Patent: Aug. 30, 2016

(54) DOWNSTREAM BURST TRANSMISSION IN PASSIVE OPTICAL NETWORKS

(71) Applicant: Futurewei Technologies, Inc., Plano, TX (US)

(72) Inventors: Yuanqiu Luo, Cranbury, NJ (US); Frank Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 102 days.

(21) Appl. No.: 14/180,095

(22) Filed: Feb. 13, 2014

(65) Prior Publication Data

US 2014/0233950 A1 Aug. 21, 2014

Related U.S. Application Data

(60) Provisional application No. 61/765,540, filed on Feb. 15, 2013.

(51) Int. Cl.
*H04B 10/272* (2013.01)
*H04Q 11/00* (2006.01)

(52) U.S. Cl.
CPC ........ *H04Q 11/0067* (2013.01); *H04B 10/272* (2013.01); *H04Q 2011/0064* (2013.01); *H04Q 2011/0086* (2013.01)

(58) Field of Classification Search
USPC .......................................................... 398/66
See application file for complete search history.

(56) References Cited

U.S. PATENT DOCUMENTS

2006/0029389 A1* 2/2006 Cleary ................. H04B 10/806
  398/33
2009/0263127 A1* 10/2009 Haran ................ H04Q 11/0067
  398/38

(Continued)

FOREIGN PATENT DOCUMENTS

| CN | 1808943 A | 7/2006 |
| CN | 102170598 A | 8/2011 |

(Continued)

OTHER PUBLICATIONS

Partial English Translation and Abstract of Chinese Patent Application No. CN1808943A, Part 1, Jul. 25, 2014, 5 pages.

(Continued)

*Primary Examiner* — David Payne
*Assistant Examiner* — Omar S Ismail
(74) *Attorney, Agent, or Firm* — Conley Rose, P.C.; Grant Rodolph; Adam J. Stegge

(57) ABSTRACT

An OLT comprising a processor configured to calculate a downstream bandwidth map that indicates an active period of time when the OLT is scheduled to transmit a data frame to an ONU, and generate a message comprising the downstream bandwidth map, and a transmitter coupled to the processor and configured to send the message to the ONU via a PON, wherein the message instructs the ONU to power off at least one ONU receive data processing unit outside the active period. Also disclosed is a computer program product comprising computer executable instructions stored on a non-transitory computer readable medium such that when executed by a processor cause an ONU to receive a message indicating an active period, wherein the active period indicates a scheduled period during which data communicated over a PON is relevant to the ONU and power down an ONU receive data processing unit outside the active period.

12 Claims, 6 Drawing Sheets

(56) References Cited

U.S. PATENT DOCUMENTS

| | | | |
|---|---|---|---|
| 2010/0111523 A1 | 5/2010 | Hirth et al. | |
| 2010/0316387 A1* | 12/2010 | Suvakovic | H04J 3/1694 398/98 |
| 2011/0211837 A1 | 9/2011 | Sugawa et al. | |
| 2012/0008937 A1 | 1/2012 | Cheng et al. | |
| 2012/0063774 A1* | 3/2012 | Niibe | H04J 3/1694 398/34 |
| 2013/0004161 A1 | 1/2013 | Xia | |
| 2013/0022356 A1* | 1/2013 | Ghazisaidi | H04Q 11/0067 398/66 |

FOREIGN PATENT DOCUMENTS

| | | |
|---|---|---|
| CN | 102196322 A | 9/2011 |
| EP | 2469786 A1 | 6/2012 |

OTHER PUBLICATIONS

Partial English Translation and Abstract of Chinese Patent Application No. CN1808943A, Part 2, Jul. 25, 2014, 24 pages.

Foreign Communication From a Counterpart Application, PCT Application No. PCT/CN2014/072119, International Search Report dated May 26, 2014, 7 pages.

Foreign Communication From a Counterpart Application, PCT Application No. PCT/CN2014/072119, Written Opinion dated May 26, 2014, 6 pages.

"Part 3: Carrier Sense Multiple Access with Collision Detection (CSMA/CD) Access Method and Physical Layer Specifications," Information Technology—Telecommunications and Information Exchange Between Systems—Local and Metropolitan Area Networks—Specific Requirements, Revision of IEEE Std 802.3, 2005, 417 pages.

"Series G: Transmission Systems and Media, Digital Systems and Networks, Digital Sections and Digital Line System—Optical Line Systems for Local and Access Networks, 10-Gigabit-Capable Passive Optical Networks (XP-PON): Transmission Convergence (TC) Layer Specification," ITU-T, Telecommunication Standardization Sector of ITU, G.987.3, Oct. 2010, 134 pages.

"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks," IEEE Computer Society, IEEE Standard 802.3ah, Sep. 7, 2004, 640 pages.

"IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks," IEEE Computer Society, IEEE Standard 802.3av, Oct. 30, 2009, 236 pages.

"Series G Transmission Systems and Media, Digital Systems and Networks, Digital sections and digital line system—Optical line systems for local and access networks, Broadband optical access systems based on Passive Optical Networks (PON), Amendment 1: PICS for OLT and ONU," ITU-T Telecommunication Standardization Sector of ITU, ITU-T -T Recommendation G.983.1 (2005) Amendment 1, May 2005, 60 pages.

"Series G Transmission Systems and Media, Digital Systems and Networks, Digital sections and digital line system—Optical line systems for local and access networks, ONT management and control interface specification for B-Pon, Amendment 2," ITU-T Recommendation G.983.2 (2005)—Amendment 2, Jan. 2007, 64 pages.

"Series G Transmission Systems and Media, Digital Systems and Networks, Digital sections and digital line system—Optical line systems for local and access networks, a broadband optical access system with increased service capability by wavelength allocation," ITU-T Recommendation G.983.3, Mar. 2001, 59 pages.

"Series G Transmission Systems and Media, Digital Systems and Networks, Digital sections and digital line system—Optical line systems for local and access networks, A broadband optical access system with increased service capability using dynamic bandwidth assignment, Corrigendum 1," ITU-T Recommendation G.983.4 (2001) Corrigendum 1, Jan. 2005, 8 pages.

"Series G Transmission Systems and Media, Digital Systems and Networks, Digital sections and digital line system—Optical line systems for local and access networks, A broadband optical access system with enhanced survivability," ITU-T Recommendation G.983.5, Jan. 2002, 60 pages.

"Series G Transmission Systems and Media, Digital Systems and Networks, Digital sections and digital line system—Optical line systems for local and access networks, Gigabit-capable passive optical networks (GPON): General characteristics, Amendment 2," ITU-T Recommendation G.984.1 (2008)—Amendment 2, Apr. 2012, 16 pages.

"Series G Transmission Systems and Media, Digital Systems and Networks, Digital sections and digital line system—Optical line systems for local and access networks, Gigabit-capable Passive Optical Networks (G-PON): Physical Media Dependent (PMD) layer specification, Amendment 2," ITU-T Recommendation G.984.2 (2003)—Amendment 2, Mar. 2008, 16 pages.

"Series G Transmission Systems and Media, Digital Systems and Networks, Digital sections and digital line system—Optical line systems for local and access networks, Gigabit-capable Passive Optical Networks (G-PON): Transmission convergence layer specification, Amendment 3," ITU-T Recommendation G.984.3 (2008)—Amendment 3, Apr. 2012, 18 pages.

"Series G Transmission Systems and Media, Digital Systems and Networks, Digital sections and digital line system—Optical line systems for local and access networks, Gigabit-capable passive optical networks (G-PON): ONT management and control interface specification, Amendment 3: Clarification of scope of application," ITU-T Recommendation G.984.4 (2008)—Amendment 3, Jul. 2010, 10 pages.

"Series G Transmission Systems and Media, Digital Systems and Networks, Digital sections and digital line system—Optical line systems for local and access networks, Gigabit capable passive optical networks (G-PON): Enhancement band, Amendment 1," ITU-T Recommendation G.984.5 (2007)—Amendment 1, Oct. 2009, 12 pages.

"Series G Transmission Systems and Media, Digital Systems and Networks, Digital sections and digital line system—Optical line systems for local and access networks, 10-Gigabit-capable passive optical networks (XG-PON): Transmission convergence (TC) layer specification," ITU-T Telecommunication Standardization Sector of ITU, Recommendation ITU-T G.987.3, Oct. 2010, 134 pages.

"Series G Transmission Systems and Media, Digital Systems and Networks, Digital sections and digital line system—Optical line systems for local and access networks, 40-Gigabit-capable passive optical networks (NG-PON2): General requirements," ITU-T Recommendation G.989.1, Mar. 2013, 26 pages.

"Series G Transmission Systems and Media, Digital Systems and Networks, Digital sections and digital line system—Optical line systems for local and access networks, Phoneline networking transceivers—Payload format and link layer requirements," ITU-T Recommendation G.989.2, Nov. 2001, 66 pages.

"Series G Transmission Systems and Media, Digital Systems and Networks, Digital sections and digital line system—Optical line systems for local and access networks, Phoneline networking transceivers—Isolation function," ITU-T Recommendation G.989.3, Mar. 2003, 20 pages.

"Series G Transmission Systems and Media, Digital Systems and Networks, GPON power conservation," ITU-T G-series Recommendations—Supplement 45, May 2009, 46 pages.

Effenberger, F., "Downstream bursting for power savings," Futurewei Technologies, Question 2, Study Group 15, Working Party 1, Intended type of document (R-C-TD): C, Fuzhou, China, Feb. 28, 2013, 4 pages.

(56) References Cited

OTHER PUBLICATIONS

Wong, S., et al., "Sleep Mode for Energy Saving PONs: Advantages and Drawbacks," 2009, 6 pages.

Foreign Communication From A Counterpart Application, European Application No. 14751791.6, Extended European Search Report dated May 2, 2016, 11 pages.

* cited by examiner

DOWNSTREAM BURST TRANSMISSION IN PASSIVE OPTICAL NETWORKS

CROSS-REFERENCE TO RELATED APPLICATIONS

The present application claims priority to U.S. Provisional Patent Application 61/765,540, filed Feb. 15, 2013 by Yuanqiu Luo, et. al., and entitled "Downstream Burst Transmission In Passive Optical Networks", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile". PON may be a point-to-multipoint (P2MP) network with passive splitters positioned in an optical distribution network (ODN) to enable a single feeding fiber from a central office to serve multiple customer premises. PON may employ different wavelengths for upstream and downstream transmissions. Some examples of PON technologies that are available in the industry may include the Ethernet passive optical networks (EPONs) defined by the Institute of Electrical and Electronics Engineers (IEEE) and the Gigabit-capable PONs (GPONs) defined by the International Telecommunication Union (ITU) Telecommunication Standardization Sector (ITU-T). The EPONs specified in IEEE documents 802.3ah and 802.3av, both of which are incorporated herein by reference, may leverage the techniques of Ethernet protocol to support P2MP connectivity with native Ethernet frames transport. The GPONs specified in ITU-T documents G.984 and G.987.3, both of which are incorporated herein by reference, may leverage the techniques of Synchronous Optical Networking/Synchronous Digital Hierarchy (SONET/SDH) and Generic Framing Protocol (GFP) to transport Ethernet frames. The IEEE EPONs and the ITU-T GPONs may employ different protocols to transport Ethernet frames, but both EPONs and GPONs may employ continuous broadcast for downstream transmission and time division multiple access (TDMA) for upstream transmission. The continuous downstream broadcast transmission may cause customer premises equipment to be powered on at all times and may not be energy efficient.

SUMMARY

In one example embodiment, the disclosure includes an optical line terminal (OLT) comprising a processor configured to calculate a downstream bandwidth map that indicates an active period of time when the OLT is scheduled to transmit a data frame to an optical network unit (ONU) and generate a message comprising the downstream bandwidth map and a transmitter coupled to the processor and configured to send the message to the ONU via a PON, wherein the message instructs the ONU to power off at least one ONU receive data processing unit outside the active period.

In another example embodiment, the disclosure includes a computer program product comprising computer executable instructions stored on a non-transitory computer readable medium such that when executed by a processor cause an ONU to receive a message comprising a downstream bandwidth map indicating an active period, wherein the active period indicates a scheduled period during which data communicated over a PON is relevant to the ONU, power up an ONU receive data processing unit during the active period, and power down the receive data processing unit for all periods outside of the active period.

In another example embodiment, the disclosure includes a method implemented at an OLT in a PON comprising calculating a downstream bandwidth map that indicates an active period of time when the OLT is scheduled to transmit a data frame to an ONU, generating a message comprising the downstream bandwidth map; and sending the message to the ONU via an optical transmitter and the PON, wherein the message instructs the ONU to power on at least one ONU receive data processing unit during the active period.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
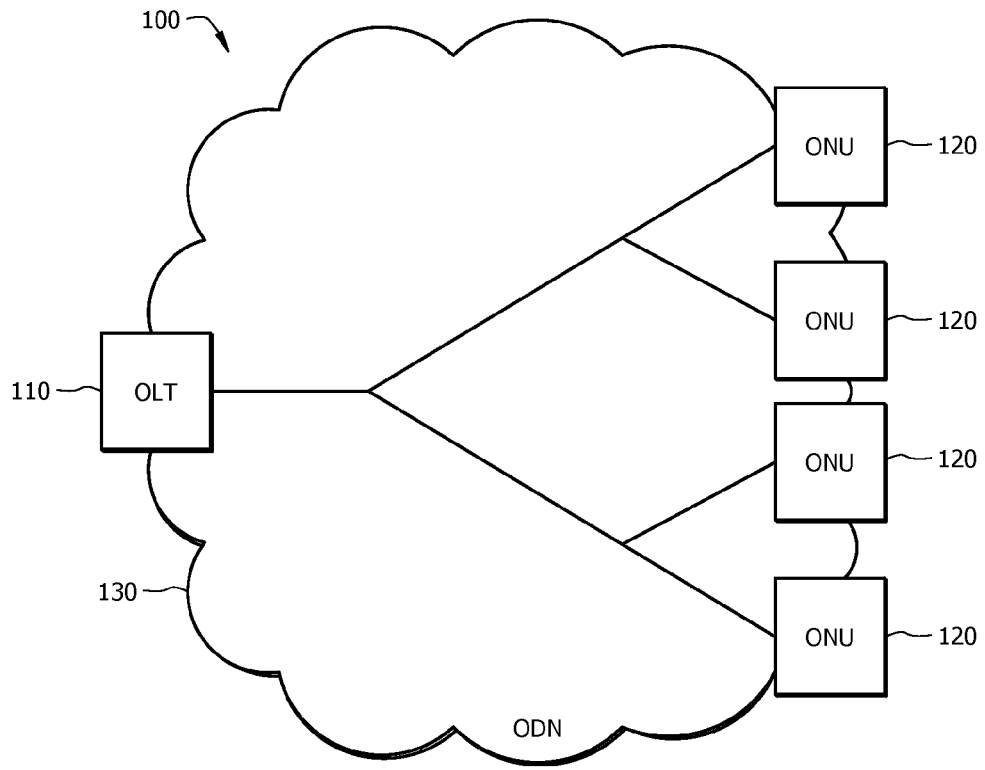
FIG. 1 is a schematic diagram of an embodiment of a PON.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

PON is a shared medium in which a single fiber at a service provider's central office may be passively split into multiple end user connections. The term passive may refer to the unpowered (e.g. without external electrical power supply) optical splitters that are used to achieve the branching of the optical signal. A PON may comprise an OLT located at the central office and connected to a plurality of ONUs located at the end users' locations, where the OLT and ONUs may be electrically powered. There may be a growing demand for network operators to save power in access networks. Research and development efforts for PON power saving techniques may focus on PON upstream direction, for example, by applying upstream power control where an ONU may adjust the ONU's transmit power based on some feedback loop (e.g. in response to OLT's instructions). Some other power saving techniques may define various power modes, which may involve a bi-directional link shut-down (e.g. sleep modes), and thus may cause packet miss and result in lower service quality.

ITU-T document Series G Supplement 45 (G.Sup45), which is incorporated herein by reference as if reproduced in its entirety, may consider various power saving techniques by defining multiple ONU power modes, such as power shedding, dozing, sleeping, fast sleep, and/or deep sleep. In power shedding mode, ONU transceivers may always be on. In sleeping, fast sleep, and/or deep sleep modes, ONU transceivers may be powered off. In dozing mode, the transmit (Tx) portion of the ONU transceiver may be powered off, while the receive (Rx) portion of the ONU transceiver may be operational at all times. Similarly, the ITU-T document G.987.3 may specify ONU power management signaling and state machines to reduce ONU's transmitter power.

In a PON, an OLT may assign upstream time slots to each ONU for upstream transmission in order to avoid multiple ONUs transmitting uplinks simultaneously, while in the downstream direction, an OLT may broadcast traffic in continuous mode to all ONUs. As such, each ONU may power on the ONU's receiver at all times and receive the OLT's downstream data regardless of the destination of the data. In some embodiments of PON applications and/or service, less than about ten percent of the broadcast downstream data may be relevant to a particular ONU. Thus, each ONU may be wasting power receiving and processing about ninety percent of the downstream data.

Disclosed herein are mechanisms for downstream burst transmission in a PON. The mechanism may enable an ONU receiver to power off at least some of the receiver's circuitry when no downstream data is destined for the ONU. An OLT may include a downstream bandwidth map in an OLT downstream transmission, where the downstream bandwidth map may indicate scheduling (e.g. allocations) of the OLT downstream transmission to each ONU. When an ONU receives the downstream bandwidth map, the ONU may coordinate the ONU's receiver power states (e.g. power on and/or off) according to the OLT downstream transmission schedule. In an embodiment, an ONU's receiver may comprise optics and/or logic circuitry (e.g. data processing units) and may power off at least some of the ONU's logic circuitry (e.g. Forward Error Correction (FEC), decryption, de-encapsulation) during a period of time when no downstream data is scheduled for the ONU. A downstream bandwidth map may indicate an OLT downstream transmission schedule in terms of active periods or inactive periods. For example, an active period may refer to a period of time when the OLT has data scheduled for an ONU, whereas an inactive period may refer to a period of time when the OLT has no data scheduled for the ONU. In one embodiment, an active period or an inactive period may be indicated via a triplet comprising an identifier field that identifies the ONU in which the allocation is destined for, a start time field that indicates the beginning of the period, and a stop time field that indicates the end of the period. In an alternative embodiment, an active period or an inactive period may be indicated via a triplet comprising a length field instead of a stop time field, where the length field may indicate the duration of the period. The downstream bandwidth map transmission position (e.g. in a downstream frame header or a separate downstream message), transmission frequency (e.g. once per downstream frame or once per a group of downstream frames), and granularity (e.g. bits, bytes, FEC codewords) may be designed and realized in multiple methods and may vary depending on the design and deployment of a network, as well as the design of an OLT. The disclosed embodiments may be applied to any standard PONs to reduce power consumption at an ONU receiver and may not affect upstream and/or downstream service quality. In addition, the disclosed embodiments may be applied to any PON with ONUs operating in a mixed mode, where some ONUs may or may not consider the downstream bandwidth map for powering off the ONUs' receive data processing units during inactive periods.

FIG. 1 is a schematic diagram of an embodiment of a PON 100. The PON 100 may comprise an OLT 110, a plurality of ONUs 120, and an ODN 130, which may be coupled to the OLT 110 and the ONUs 120. The PON 100 may be a communication network that does not require any active components to distribute data between the OLT 110 and the ONUs 120. Instead, the PON 100 may use the passive optical components in the ODN 130 to distribute data between the OLT 110 and the ONUs 120. In an embodiment, the PON 100 may be a Next Generation Access (NGA) system, such as a ten gigabit per second (Gbps) GPON (XGPON), which may have a downstream bandwidth of about ten Gbps and an upstream bandwidth of at least about 2.5 Gbps. Alternatively, the PON 100 may be any Ethernet based network, such as an EPON defined by the IEEE document 802.3ah, a 10 Gigabit EPON (10GEPON) defined by the IEEE document 802.3av, an asynchronous transfer mode PON (APON), a broadband PON (BPON) defined by the (ITU-T) document G.983, a GPON defined by the ITU-T document G.984, a XGPON defined by the ITU-T document G.987.3, all of which are incorporated herein by reference as if reproduced in their entirety, or a wavelength division multiplexed (WDM) PON (WPON).

The OLT 110 may be any device configured to communicate with the ONUs 120 and another backbone network (e.g. the Internet). Specifically, the OLT 110 may act as an intermediary between the backbone network and the ONUs 120. For instance, the OLT 110 may forward data received from the backbone network to the ONUs 120, and forward data received from the ONUs 120 onto the backbone network. Although the specific configuration of the OLT 110 may vary depending on the type of PON 100, in an embodiment, the OLT 110 may comprise a transmitter and a receiver. When the backbone network employs a network protocol, such as Ethernet or SONET/SDH, that is different from the PON protocol used in the PON 100, the OLT 110 may comprise a converter that may convert the network protocol into the PON protocol. The OLT 110 converter may also convert the PON protocol into the network protocol. The OLT 110 may be located at a central location, such as a central office, but may be located at other locations as well.

The ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. It should be noted that the optical fiber cables may be replaced by any optical transmission media in some embodiments. In some embodiments, the ODN 130 may comprise one or more active components, such as optical amplifiers. The ODN 130 may extend from the OLT 110 to the ONUs 120 in a branching configuration as shown in FIG. 1, but may be alternatively configured as determined by a person of ordinary skill in the art.

The ONUs 120 may be any devices configured to communicate with the OLT 110 and a customer or user. Specifically, the ONUs 120 may act as an intermediary between the OLT 110 and the customer. For instance, the ONUs 120 may forward data received from the OLT 110 to the customer, and forward data received from the customer to the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to and from a customer device. In some embodiments, ONUs 120 and optical network terminals (ONTs) are similar, and thus the terms are used interchangeably herein. The ONUs 120 may be located at distributed locations, such as the customer premises, but may be located at other locations as well.

In PON 100, the OLT 110 may perform upstream dynamic bandwidth allocation to assign upstream transmission bandwidths to ONUs 120. For example, OLT 110 may send upstream bandwidth messages (e.g. EPON Gate messages or GPON bandwidth map (BWmap)) to inform ONUs 120 of the upstream bandwidth assignments. In the downstream direction, the OLT 110 may operate in a continuous mode where downstream data is broadcast to all ONUs 120. In an embodiment, OLT 110's transmitter may process, encapsulate, and transmit downstream frames continuously. Downstream frames may carry user data for ONUs 120 and/or idle data, where the idle data may be employed for stuffing during a period of time where no user data is available for transmission. Each ONU 120 may always power on the ONU 120's receiver optics and circuitry to detect and de-encapsulate the OLT 110 downstream frames. However, when the ONU 120 performs Media Access Control (MAC) processing, the ONU 120 may filter out data packets that are not destined to the ONU 120 and forward the data packets that are destined to the ONU 120 towards the ONU 120's user client. Some of the ONU 120 receiver's logic circuitry (e.g. data processing units), such as the FEC (e.g. Reed Solomon (RS) code)) unit, the data decryption (e.g. Advance Encryption Standard (AES)) unit, and/or the data frame de-encapsulation (e.g. GPON Encapsulation Method (GEM) or 10 GEM (XGEM)) unit, may consume a significant portion of the overall receiver power. In addition, the FEC unit, the decryption unit, and/or the—encapsulation unit may operate on buffered data bits, where buffer management and memory access may further consume power.

Figure 2:
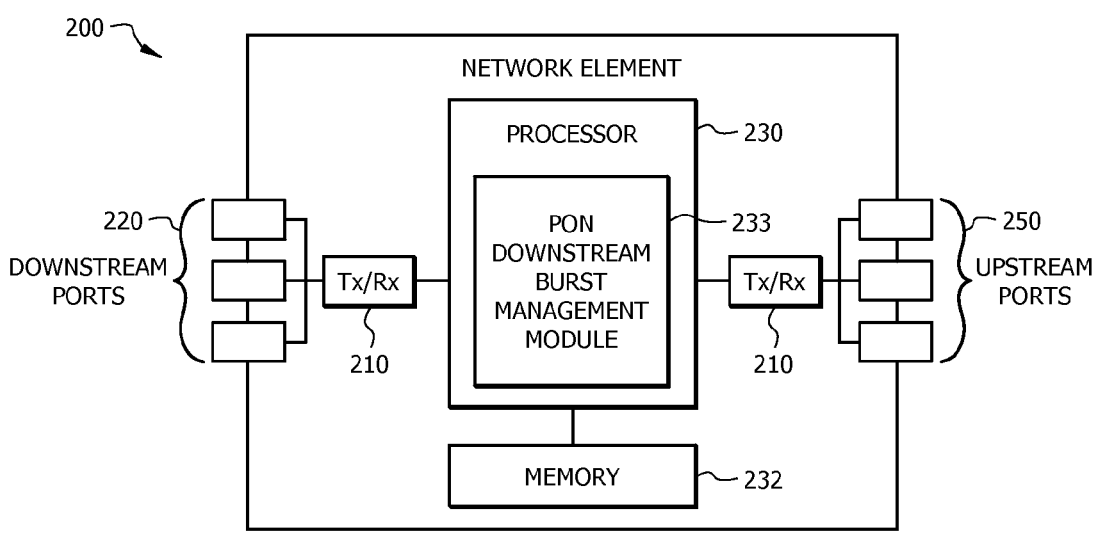
FIG. 2 is a schematic diagram of an embodiment of a network element (NE).

FIG. 2 is a schematic diagram of an example embodiment of an NE 200, which may act as an OLT (e.g. OLT 110) or an ONU (e.g. ONU 120) in a PON (e.g. PON 100). NE 200 may be configured to manage downstream bandwidth allocations and bandwidth map transmissions or downstream power consumption. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 200. For instance, the features/methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes and a Tx/Rx 210 may be coupled to plurality of upstream ports 250 for transmitting and/or receiving frames from other nodes, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise a PON downstream burst management module 233, which may implement a downstream bandwidth map transmission method 500 or an ONU's receiver power management method 600 as discussed more fully below. In an alternative embodiment, the PON downstream burst management module 233 may be implemented as instructions stored in the memory devices 232, which may be executed by processor 230. The memory device 232 may comprise a cache for temporarily storing content, e.g., a Random Access Memory (RAM). Additionally, the memory device 232 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
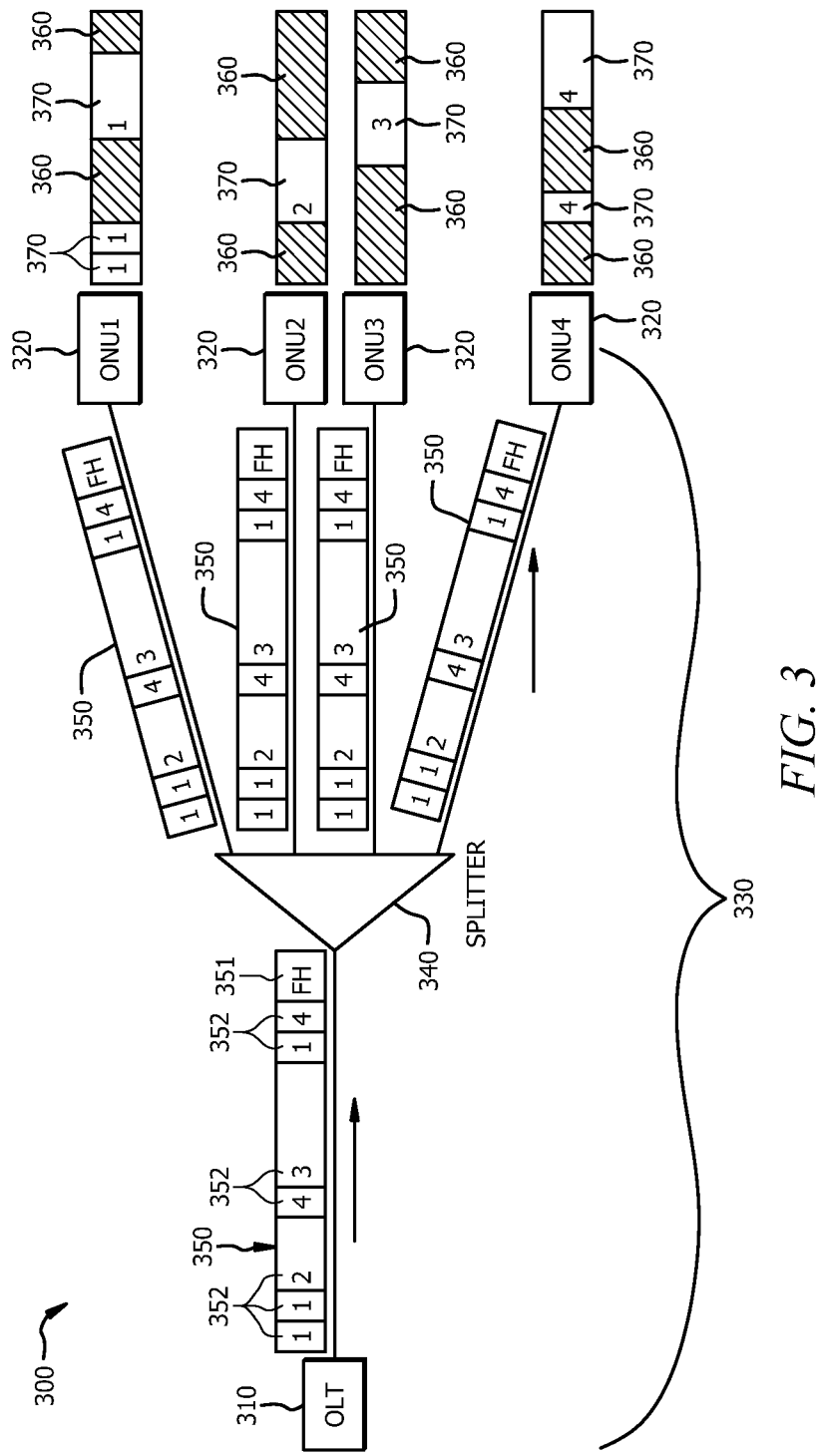
FIG. 3 illustrates an embodiment of downstream broadcast transmission in a PON.

FIG. 3 illustrates an embodiment of downstream broadcast transmission in a PON 300, which may be substantially similar to PON 100. The PON 300 may comprise an OLT 310, plurality of ONUs 320, a splitter 340, and an ODN 330. The OLT 310, ONUs 320, and ODN 330 may be substantially similar to OLT 110, ONUs 120, and ODN 130, respectively. The splitter 340 may be any passive optical device or component configured to split an input light beam into a plurality of output light beams. For example, the splitter 340 may distribute a downstream optical signal transmitted by the OLT 310 into a plurality of optical signals and deliver the distributed optical signals such that each ONU 320 may receive the downstream optical signal. In PON 300, OLT 310 may continuously broadcast downstream signal to the ONUs 320. For example, OLT 310 may transmit a downstream frame 350 comprising a frame header (FH) 351 and a plurality of user data packets 352 for the ONUs 320. The FH 351 may comprise a BWmap that indicates upstream bandwidth allocations and some physical layer operations and maintenance (PLOAM) messages. The user data packets 352 may be destined for at least one of the ONUs 320. Each ONU 320 may detect and de-encapsulate the entire downstream frame 350. After the ONU 320 processed the downstream frame 350 at a MAC layer, the ONU 320 may filter out a portion 360 of the downstream frame 350 that is not destined for the ONU 320 and forward the portions 370 that are destined for the ONU 320 to the ONU 320's user clients. In PON 300, each ONU 320 receiver optic and data processing units may always be powered regardless of the destinations of the data.

Figure 4:
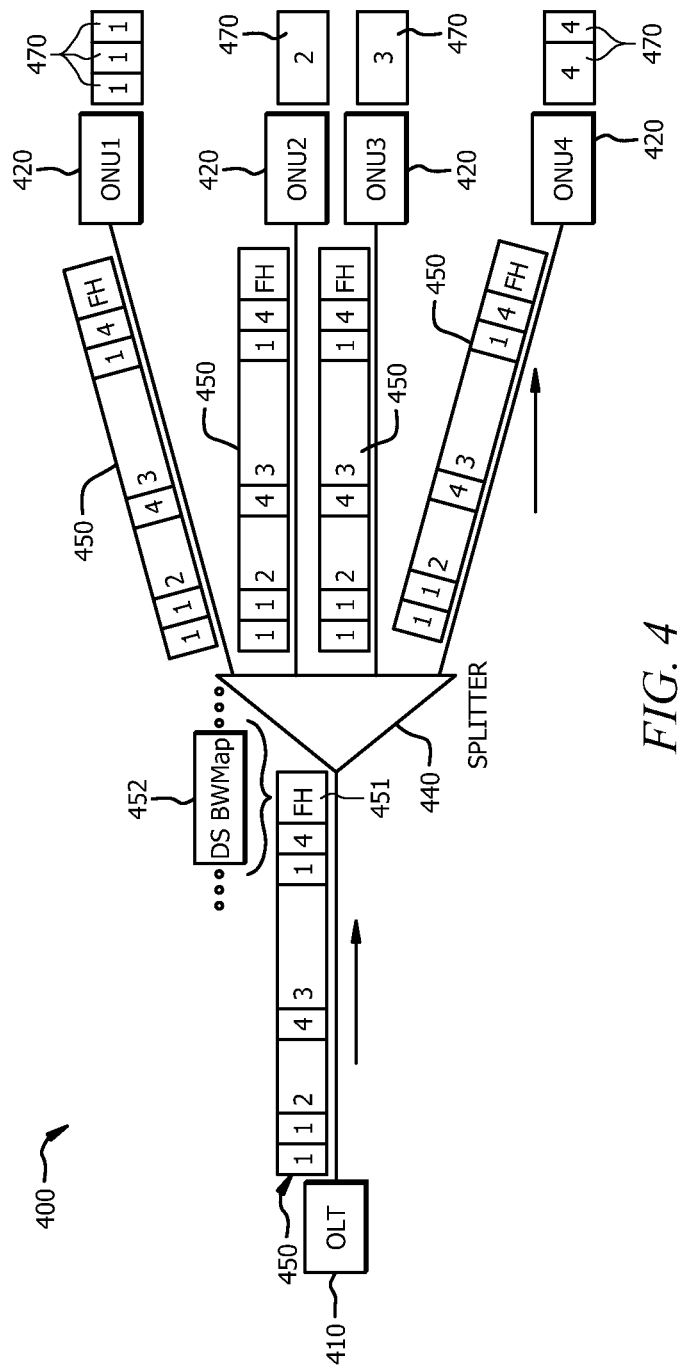
FIG. 4 illustrates an embodiment of downstream burst transmission in a PON.

FIG. 4 illustrates an embodiment of downstream burst transmission in a PON 400. The PON 400 may be substantially similar to PON 300 and may comprise an OLT 410, a plurality of ONUs 420, and a splitter 440, which may be substantially similar to OLT 310, ONUs 320, and splitter 340, respectively. In PON 400, the OLT 410 may transmit a downstream frame 450, which may be substantially similar to downstream frame 350, but may comprise an additional downstream bandwidth map (DWBWmap) 452 (e.g. within FH 451). The downstream bandwidth map 452 may inform ONUs 420 of time periods in which the OLT 410 has downstream data scheduled (e.g. active periods) for a particular ONU 420 or has no downstream data scheduled (e.g. inactive periods) for a particular ONU 420. The OLT downstream transmission schedule given in the downstream bandwidth map 452 may enable each ONU 420 to coordinate the ONU's 420 receiver power states to reduce power consumption during a period of time in which no data is scheduled for the ONU 420. In an embodiment, an ONU 420 may comprise receive optic circuitry, frame header processing logic or unit, and data processing logic or unit. In such embodiment, the ONU 420 may always power on the ONU 420's receive optic circuitry and frame header processing unit for downstream frame detection and/or synchronization, as well as frame header processing. When the ONU 420 receives the downstream bandwidth map 452, the ONU 420 may determine one or more periods of time (e.g. active periods) when the OLT 410 is scheduled to transmit data to the ONU 420, and thus may power on the ONU 420's receiver during the active periods and may at least power off some of the ONU's receive data processing units (e.g. FEC, decryption, de-encapsulation) outside the active periods (e.g. inactive periods) in which the downstream frame 450 carries data destined for other ONUs 420. As can be seen in PON 400, each ONU 420 may receive one or more relevant portions 470 of the downstream frame 450 that is destined for the ONU 420 and no received data is filtered out. Thus, each ONU 420 may save the power that may otherwise be consumed for receiving and processing data that is destined for other ONUs 420 and then filtering out and/or discarding the data. In some embodiments of PON applications and/or services, each ONU 420 may receive less than about ten percent of the downstream data that is relevant to the ONU 420. As such, each ONU 420 may be able to power down some of the ONU 420's receive data processing units about ninety percent of the time, and thus may reduce the overall power consumption by about thirty percent.

Figure 5:
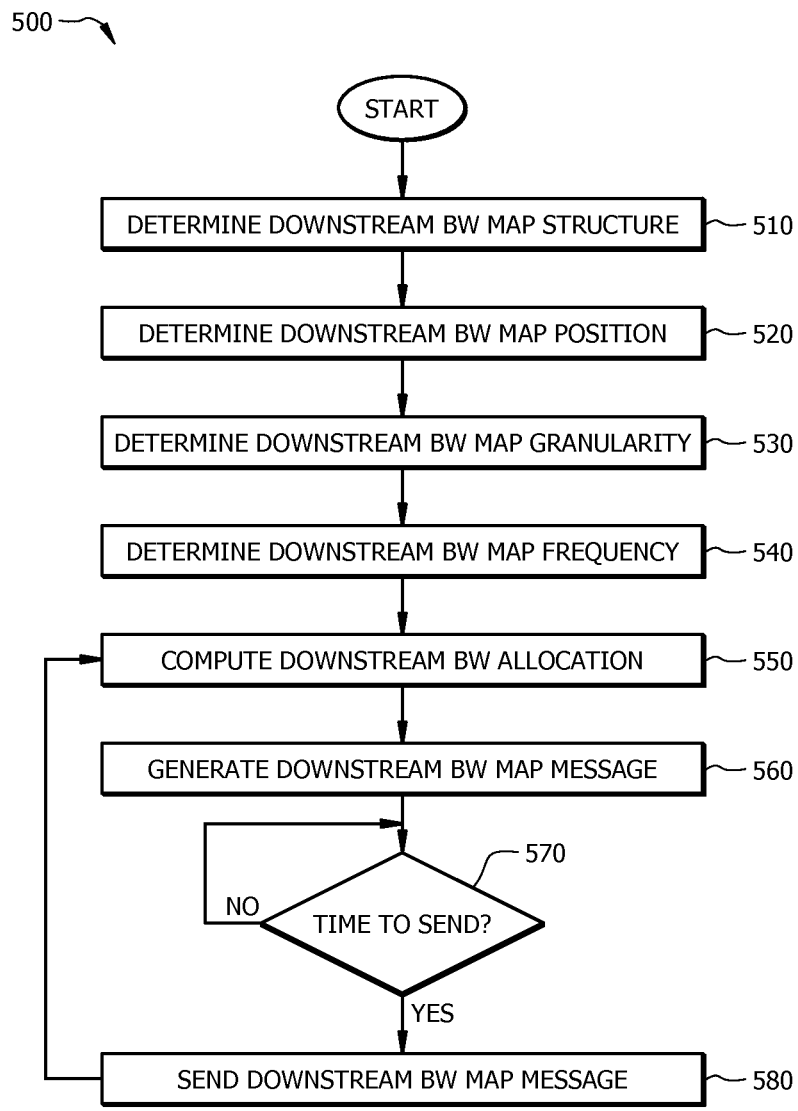
FIG. 5 is a flowchart of an embodiment of a method for downstream bandwidth map transmission.

FIG. 5 is a flowchart of an embodiment of a method 500 for downstream bandwidth map transmission, which may be implemented on an OLT (e.g. OLT 410). Method 500 may begin with determining a downstream bandwidth (BW) map structure at step 510. The downstream bandwidth map may be structured to indicate active periods and/or inactive periods. An active period may refer to a period of time when the OLT has data scheduled for a particular ONU (e.g. ONU 420), whereas an inactive period may refer to a period of time when the OLT has no data scheduled for that particular ONU. In one embodiment, an active period or an inactive period may be indicated via a triplet comprising an identifier field, a start time field, and a stop time field. For example, the start time field of an active period may indicate the beginning of an OLT scheduled transmission to an ONU corresponding to the identifier (e.g. ONU-identifier (ONU-ID) or an allocation-identifier (Alloc-ID)) and the end of the OLT transmission schedule may be indicated by the stop time field. Conversely, the start time field of an inactive period may indicate when an OLT is scheduled to stop transmitting data to an ONU corresponding to the identifier and the end of the inactive period may be indicated by the stop time field. In an alternative embodiment, an active period or an inactive period may be indicated via a triplet comprising a length field instead of the stop time field, where the length field may indicate the duration of the active period or inactive period. It should be noted that an OLT may inform an ONU of the inactive periods instead of active periods since a missed detection and/or a decoding error of an inactive period may cause an ONU to consume extra power, but may not affect service quality.

At step 520, method 500 may determine the downstream bandwidth map position. The downstream bandwidth map may be located in any position within a downstream frame. For example, an ONU's receiver may receive the downstream bandwidth map at the beginning of a downstream frame so that the ONU may synchronize to the downstream frame and coordinate and/or schedule the power states of the ONU's receive data processing units for the remaining of the downstream frame. In an embodiment of a XGPON transmission convergence layer (XGTC) frame, the downstream bandwidth map may be positioned in the XGTC frame header (e.g. at the beginning of a downstream frame) next to the upstream bandwidth map (e.g. either before or after) or may be transmitted in a separate dedicated downstream message (e.g. with a specific port identifier (ID)).

At step 530, method 500 may determine the downstream bandwidth map granularity. The downstream bandwidth map granularity may be represented in various forms. In one embodiment, the downstream bandwidth map may indicate the start time field, the stop time field, and/or the length field in terms of bits, bytes (e.g. 8-bits), or words (e.g. 32 bits). In such embodiment, the selected granularity may determine the size of the fields (e.g. start time, stop time, and/or size) in the downstream bandwidth map, where the size may be relatively large when employing a small granularity (e.g. bits). In another embodiment, the downstream bandwidth map may indicate the start time field, the stop time field, and/or the length field in terms of FEC codewords, where an OLT may instruct an ONU to ignore some FEC codewords within a downstream frame. In such embodiment, the ONU's receiver may decode at the FEC codeword boundary and may perform further processing to retrieve the beginning of a data packet addressed to the ONU accordingly. In another embodiment, the downstream bandwidth may indicate the start time field, the stop time field, and/or the length field in granularity of a downstream frame. In such embodiment, an OLT may send some clock and/or timing information in a downstream frame header to enable an ONU to delineate downstream frames (e.g. XGEM frames) and/or FEC codewords. Some disadvantages of such an embodiment may result in a reduced power saving at an ONU since the ONU may not be able to power down any of the ONU's receive data processing units whenever a downstream frame comprises one user data destined for the ONU.

At step 540, method 500 may determine the downstream bandwidth map transmission frequency. The downstream bandwidth map transmission frequency may be determined by an OLT according to the OLT design or network deployment, where the transmission frequency may be high (e.g. per downstream frame) or low (e.g. per a group of downstream frames). However, when the downstream bandwidth map is transmitted in a separate dedicated downstream message, the downstream bandwidth map may be transmitted periodically to reduce complexity in ONUs' synchronization.

At step 550, method 500 may compute downstream bandwidth allocation according to Quality of Service (QoS), traffic load, etc. At step 560, method 500 may generate a downstream bandwidth map message according to the computed downstream bandwidth allocation, the downstream bandwidth map structure (e.g. active periods or inactive periods), and the downstream bandwidth map granularity. At step 570, method 500 may wait for the downstream bandwidth map transmission time according to the downstream bandwidth map transmission frequency. At step 580, method 500 may transmit the downstream bandwidth map message at the downstream bandwidth map transmission time and according to the downstream bandwidth map position. As shown in the loop of steps 550-580, method 500 may continue to generate downstream bandwidth maps and transmit downstream bandwidth map message for the duration of downstream operation and in addition, some of the steps in method 500 (e.g. transmission frequency in step 530) may be repeated during the downstream operation, for example, to adapt to network changes. It should be noted that the downstream bandwidth map structure, position, granularity, and transmission frequency may be determined in numerous mechanisms as determined appropriate by a person of ordinary skill in the art to achieve the same functionalities.

Figure 6:
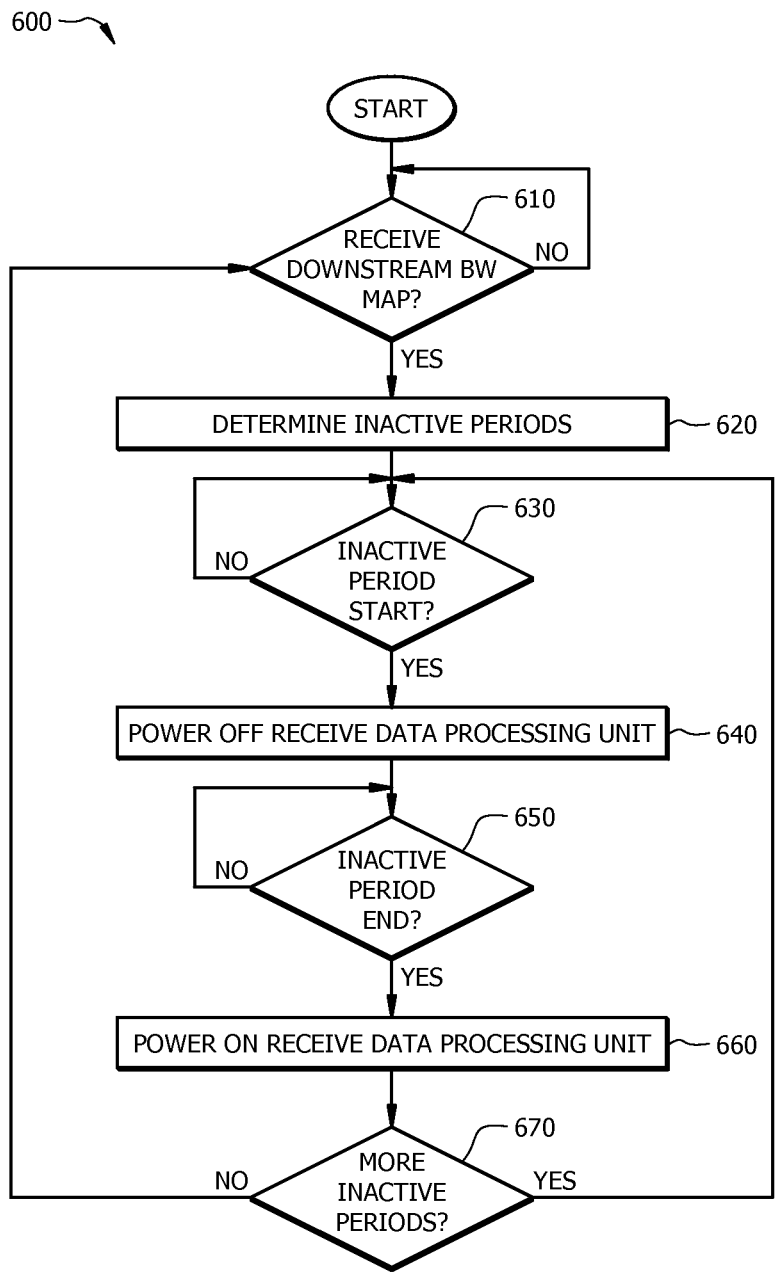
FIG. 6 is a flowchart of an embodiment of a method for ONU receiver power management.

FIG. 6 is a flowchart of an embodiment of a method 600 for ONU receiver power management, which may be implemented on an ONU (e.g. ONU 420). Method 600 may begin with waiting for a downstream bandwidth map at step 610, where the downstream bandwidth map may indicate active periods or inactive periods. Upon receiving a downstream bandwidth map, method 600 may proceed to step 620. At step 620, method 600 may determine inactive periods according to the received downstream bandwidth map. At step 630, method 600 may wait for the inactive period to start. Upon the starting of an inactive period, method 600 may proceed to step 640. At step 640, method 600 may power off the receive data processing units (e.g. FEC, decryption, and/or de-encapsulation). After powering off the receive data processing units, method 600 may wait for the inactive period to end at step 650. When the inactive period ends, method 600 may proceed to step 660. At step 660, method 600 may power on the receive data processing units. It should be noted that method 600 may include some power up and/or down transition time at steps 630 and 650 according to the hardware and/or software design and/or coordination of power states for the receive data processing units.

At step 670, method 600 may determine whether more inactive periods are scheduled according to the received downstream bandwidth map message. When the downstream bandwidth map message indicates more inactive periods, method 600 may proceed to step 630 and wait for the next inactive period. The loop of steps 630-670 may be repeated until all the scheduled inactive periods indicated in the downstream bandwidth map message are handled. When all the inactive periods are handled, method 600 may proceed to step 610 and wait for the next downstream bandwidth map message. Method 600 may be repeated for the duration of downstream operation.

Figure 7:
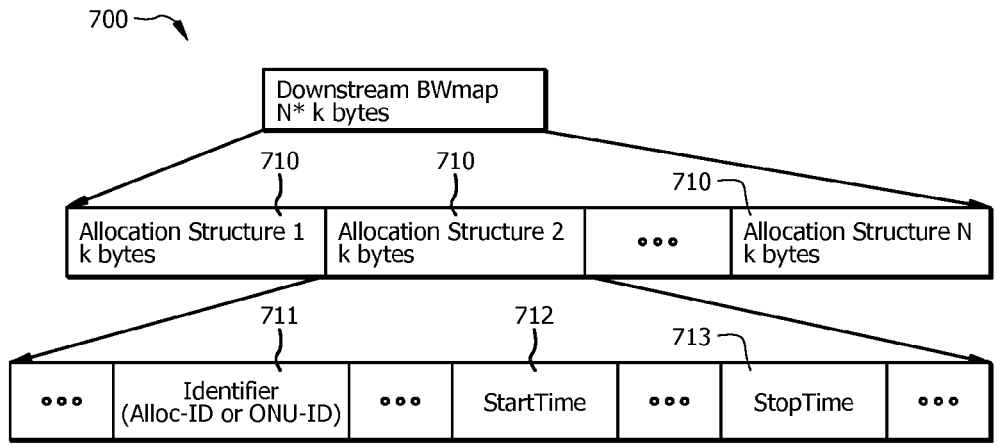
FIG. 7 is a schematic diagram of an embodiment of a downstream bandwidth map.

FIG. 7 is a schematic diagram of an embodiment of a downstream bandwidth map 700, which may be employed in method 500 and/or 600 in a PON (e.g. PON 100, 300, and/or 400). The downstream bandwidth map 700 may comprise a plurality of allocation structures 710. Each allocation structure 710 may comprise an identifier field 711, a start time field 712, and a stop time field 713. The identifier field 711 may be an Alloc-ID or an ONU-ID indicating the destination or recipient of a scheduled downstream transmission. The start time field 712 may indicate the starting time of the scheduled downstream transmission (e.g. active period) destined for an ONU with the corresponding Alloc-ID or ONU-ID. The stop time field 713 may indicate the completion time of the scheduled downstream transmission. Alternatively, the downstream bandwidth map 700 may employ a size field instead of the stop time field 713 to indicate the duration of the scheduled downstream data. The size of each field (e.g. identifier 711, start time 712, stop time 713) in the downstream bandwidth map 700 may vary and may depend on the downstream bandwidth map granularity size (e.g. bits, bytes, words, FEC codewords, downstream frame, etc.), which may be determined by an OLT. It should be noted that the downstream bandwidth map 700 may reuse and/or modify the BWmap format or may be carried in a separate dedicated downstream message. In addition, the downstream bandwidth map 700 may carry one or more allocation structures 710 with the same or different identifier field 711 (e.g. multiple allocations for a particular ONU) and may or may not carry an allocation structure 710 for every ONU (e.g. based on traffic needs).

In an embodiment, an ONU (e.g. ONU 420) may consider the downstream bandwidth map 700 for powering down the ONU's receive data processing units accordingly. The ONU may always power on the ONU's receive optic circuitry, some packet detection and/or frame header processing unit to detect an OLT downstream frame and/or process the frame header of the downstream frame. The ONU may receive and process the downstream bandwidth map 700 (e.g. at a downstream frame header or a separate downstream message). Upon determining the active periods or scheduled transmissions destined for the ONU, the ONU may schedule the power states of the ONU's receive data processing units such that the ONU may power on the receive data processing units to process the data that is destined (e.g. relevant) to the ONU and power down the ONU's receive data processing units in all periods outside the active periods.

Figure 8:
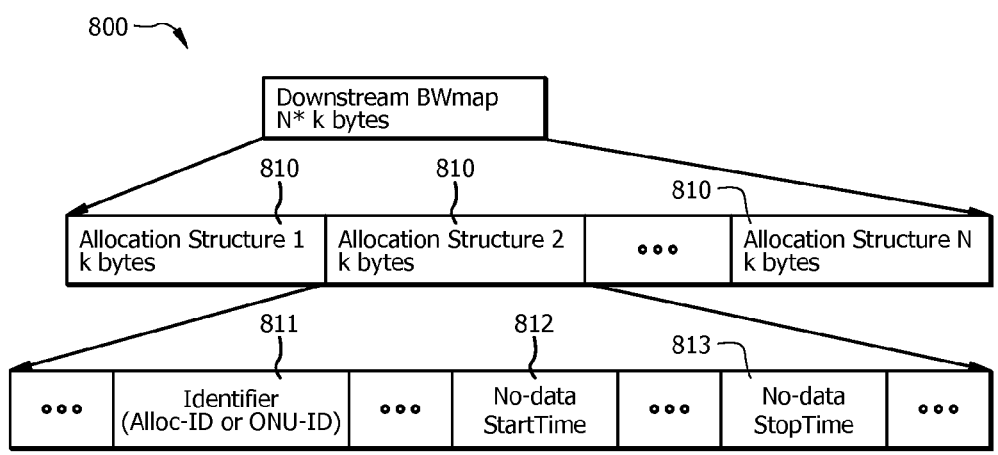
FIG. 8 is a schematic diagram of another embodiment of a downstream bandwidth map.

FIG. 8 is a schematic diagram of another embodiment of a downstream bandwidth map 800, which may be employed in methods 500 and/or 600 in a PON (e.g. PON 100, 300, and/or 400). The downstream bandwidth map 800 may comprise a plurality of allocation structures 810. Each allocation structure 810 may comprise an identifier field 811, a start time field 812, and a stop time field 813, which may be substantially similar to identifier field 711, start time field 712, and stop time field 713, respectively. However, the start time field 812 may indicate the starting time of an unscheduled period (e.g. inactive period) for an ONU with the corresponding Alloc-ID or ONU-ID instead of a scheduled transmission period and the stop time field 813 may indicate the completion time of the unscheduled period. Similarly, the downstream bandwidth map 800 may employ a size field instead of the stop time field 813 to indicate the duration of the downstream data not destined for the corresponding ONU.

In an alternative embodiment, an ONU (e.g. ONU 420) may consider the downstream bandwidth map 800 for powering down the ONU's receive data processing units accordingly. Similarly, the ONU may always power on the ONU's receive optic circuitry, some packet detection and/or frame header processing unit to detect an OLT downstream frame and/or process the frame header of the downstream frame. The ONU may receive and process the downstream bandwidth map 800 (e.g. at a downstream frame header or a separate downstream message). Upon determining the inactive periods (e.g. transmissions not destined to the ONUs), the ONU may schedule the power states of the ONU's receive data processing units such that the ONU may power off the receive data processing units during the inactive periods and power on the ONU's receive data processing units for all periods outside the inactive periods.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means ±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical line terminal (OLT) comprising:
a processor configured to:
calculate a downstream bandwidth map that indicates active periods of time when the OLT is scheduled to transmit data frames to an optical network unit (ONU), wherein the downstream bandwidth map indicates the active periods by indicating associated inactive periods, and wherein the downstream bandwidth map comprises:
an identifier field that identifies the ONU;
a plurality of start time fields that indicate start times of the inactive periods; and
a plurality of stop time fields that indicate completion times of the inactive periods; and
generate a message comprising the downstream bandwidth map; and
a transmitter coupled to the processor and configured to send the message to the ONU via a passive optical network (PON), wherein the message instructs the ONU to power off an ONU receive data processor outside the active periods.

2. The OLT of claim 1, wherein the message further comprises a downstream frame header, and wherein the downstream bandwidth map is positioned in the downstream frame header.

3. The OLT of claim 1, wherein the message is a dedicated downstream bandwidth map message.

4. The OLT of claim 1, wherein the message is transmitted in at least one of the following frames: a modified PON frame, a Gigabit PON (GPON) Encapsulation Method (GEM) frame, and a 10 GEM (XGEM) frame.

5. The OLT of claim 1, wherein the active periods are indicated with a granularity of a bit, a byte, a word, a Forward Error Correction (FEC) codeword, a downstream frame, or combinations thereof.

6. The OLT of claim 1, wherein a transmission frequency of the message is once per downstream frame, once per a group of downstream frames, or combinations thereof.

7. A computer program product comprising computer executable instructions stored on a non-transitory computer readable medium such that when executed by a processor cause an optical network unit (ONU) to:
receive a message comprising a downstream bandwidth map indicating active periods by indicating associated inactive periods, wherein the inactive periods indicate scheduled periods during which data communicated over a passive optical network (PON) is not relevant to the ONU, and wherein the downstream bandwidth map comprises:
an identifier field that identifies the ONU;
a plurality of start time fields that indicate start times of the inactive periods; and
a plurality of stop time fields that indicate completion times of the inactive periods;
power up an ONU receive data processor during the active periods; and
power down the GNU receive data processor for all periods outside of the active periods.

8. The computer program product of claim 7, wherein the ONU receive data processor comprises at least one of:
a Forward Error Correction (FEC) unit;
a decryption unit; and
a frame de-encapsulation unit.

9. A method implemented at an optical line terminal (OLT) in a passive optical network (PON) comprising:
calculating a downstream bandwidth map that indicates active periods of time when the OLT is scheduled to transmit data frames to an optical network unit (ONU), wherein the downstream bandwidth map indicates the active periods by indicating associated inactive periods, and wherein the downstream bandwidth map comprises:
an identifier field that identifies the ONU;
a plurality of start time fields that indicate start times of the inactive periods; and
a plurality of stop time fields that indicate completion times of the inactive periods;
generating a message comprising the downstream bandwidth map; and
sending the message to the ONU via an optical transmitter and the PON, wherein the message instructs the ONU to power on at least one ONU receive data processor during the active periods.

10. The method of claim 9, wherein the downstream bandwidth map is positioned in a downstream frame header, a dedicated downstream bandwidth map message, or combinations thereof.

11. The method of claim 9, wherein a granularity for the active periods is a bit, a byte, a word, a Forward Error Correction (FEC) codeword, a downstream frame, or combinations thereof.

12. The method of claim 9, wherein a transmission frequency for the downstream bandwidth map is once per a downstream frame, once per a group of downstream frames, or combinations thereof.

* * * * *